United States Patent
Wang et al.

(10) Patent No.: US 12,461,579 B2
(45) Date of Patent: Nov. 4, 2025

(54) DESIGNING HIGH TDP MXM MODULE POWER SOLUTION FOR AUTONOMOUS VEHICLES

(71) Applicant: Apollo Autonomous Driving USA LLC, Sunnyvale, CA (US)

(72) Inventors: David Wang, Sunnyvale, CA (US); Peng Cheng, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 210 days.

(21) Appl. No.: 18/486,870

(22) Filed: Oct. 13, 2023

(65) Prior Publication Data

US 2025/0123662 A1 Apr. 17, 2025

(51) Int. Cl.
| | |
|---|---|
| G06F 1/26 | (2006.01) |
| B60L 50/60 | (2019.01) |
| B60W 30/182 | (2020.01) |
| B60W 60/00 | (2020.01) |
| H03K 17/687 | (2006.01) |

(52) U.S. Cl.
CPC ............. *G06F 1/26* (2013.01); *B60L 50/60* (2019.02); *B60W 30/182* (2013.01); *B60W 60/001* (2020.02); *H03K 17/6871* (2013.01); *B60L 2220/50* (2013.01)

(58) Field of Classification Search
CPC ..... G06F 1/26; H03K 17/687; B60L 2220/50; B60L 50/60; B60W 30/182; B60W 60/001
See application file for complete search history.

(56) References Cited

U.S. PATENT DOCUMENTS

| | | | |
|---|---|---|---|
| 2022/0286038 A1* | 9/2022 | Tsai ............. | H02M 1/10 |
| 2023/0123653 A1* | 4/2023 | Stanke .......... | H02J 9/06 307/66 |
| 2023/0347936 A1* | 11/2023 | Masuda ......... | B60L 53/14 |

* cited by examiner

*Primary Examiner* — Terrell S Johnson
(74) *Attorney, Agent, or Firm* — WOMBLE BOND DICKINSON (US) LLP

(57) ABSTRACT

In one embodiment, a power circuit for an autonomous driving vehicle (ADV) includes a first power source having a first power rating. The circuit includes a second power source having a second power rating. The circuit includes a switch coupled to the first and second power sources, the switch being configured to determining a power operating mode of an accelerator device, where the power operating mode is one of a primary mode, a secondary mode, and a dual mode. The circuit includes a first power transistor coupled between the first power source and the accelerator device and a second power transistor coupled between the second power source and the accelerator device, where the first and second power transistors are operable according to the power operating mode.

20 Claims, 11 Drawing Sheets

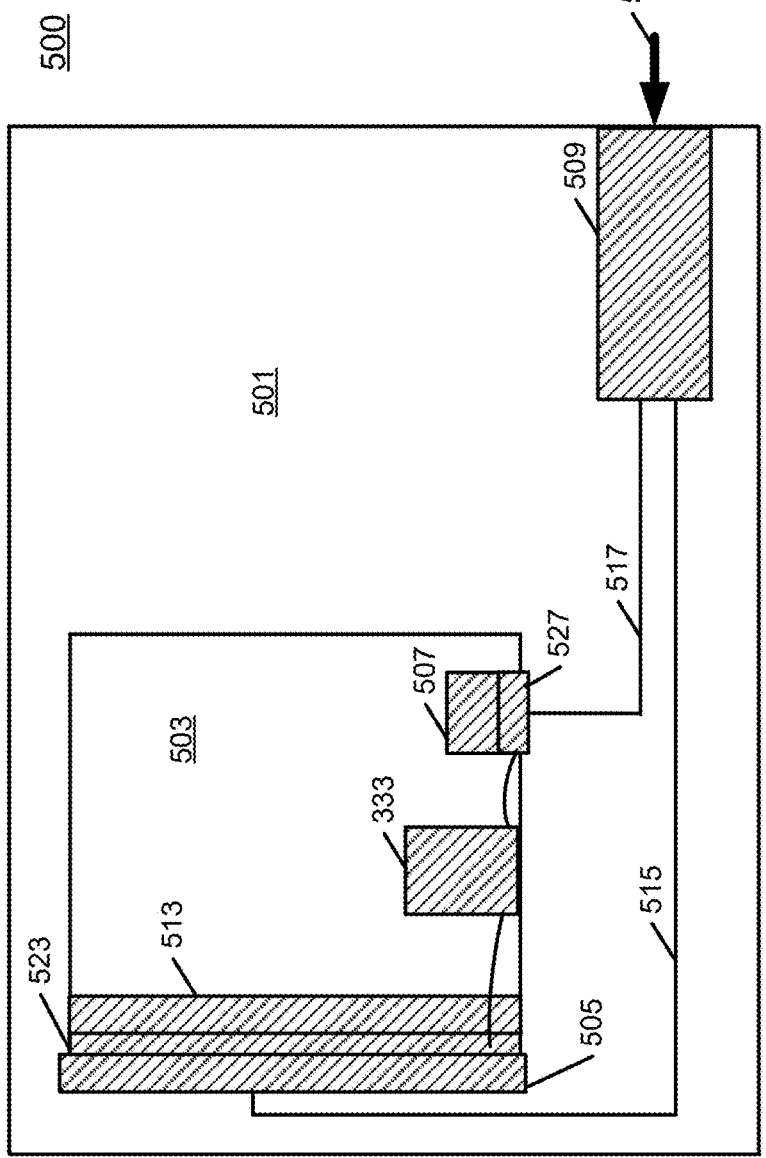
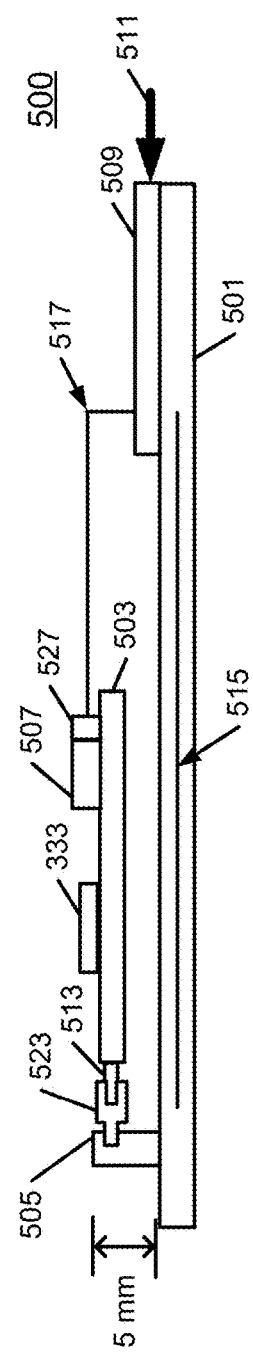
FIG. 5A
FIG. 5B

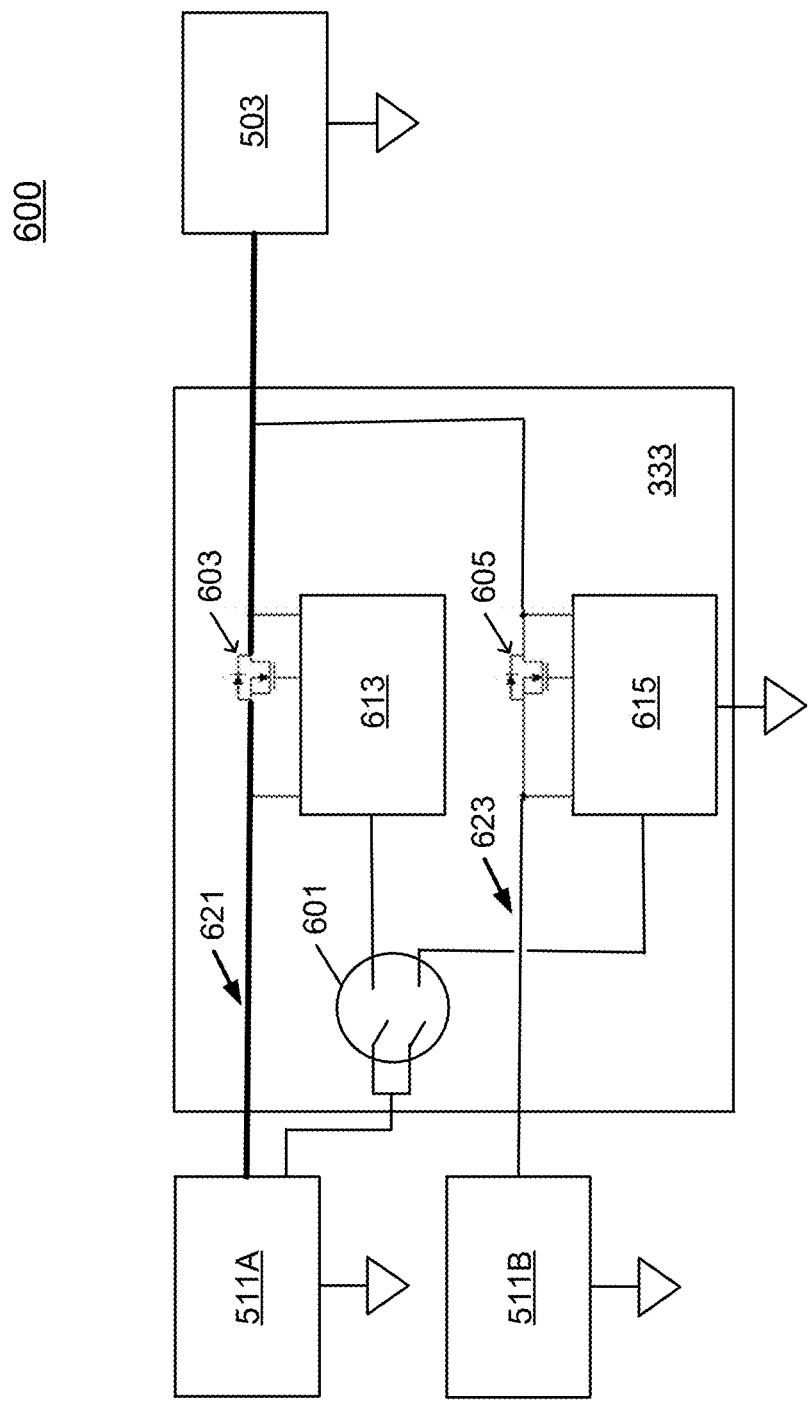

DESIGNING HIGH TDP MXM MODULE POWER SOLUTION FOR AUTONOMOUS VEHICLES

TECHNICAL FIELD

Embodiments of the present disclosure relate generally to operating autonomous driving vehicles. More particularly, embodiments of the disclosure relate to designing a high thermal design power (TDP) mobile PCI express module (MXM) module power solution for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Autonomous driving vehicles demand high performance computing systems that consume lots of power while at the same time the high performance computing systems should have a compact profile. The compact profile ensures the computing system will take up minimal space on the vehicles.

BRIEF DESCRIPTION OF THE DRAWINGS

Embodiments of the disclosure are illustrated by way of example and not limitation in the figures of the accompanying drawings in which like references indicate similar elements.

FIG. 5A is a top view of a block diagram illustrating a mobile computing platform for an autonomous driving vehicle according to one embodiment.

FIG. 5B is a side view of a block diagram illustrating a mobile computing platform for an autonomous driving vehicle according to one embodiment.

FIG. 6A is a block diagram illustrating a power mode circuit operating in a primary mode according to one embodiment.

DETAILED DESCRIPTION

Figure 1:
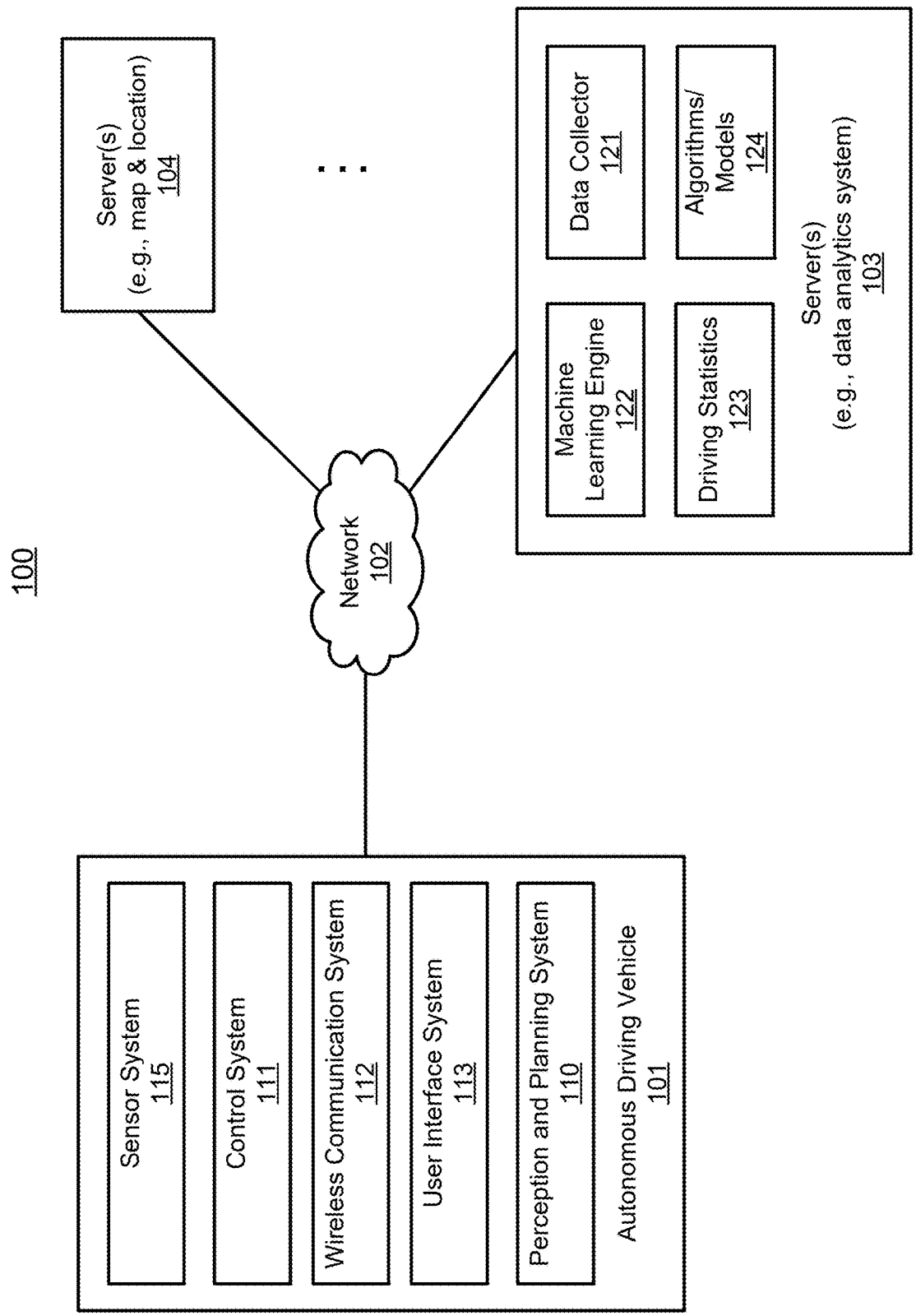
FIG. 1 is a block diagram illustrating a networked system according to one embodiment.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a flexible power scheme is disclosed to provide up to 600 watts of power for an accelerator device on a MXM interface of a computing platform of an autonomous driving vehicle. The accelerator device can be a vision processing unit (VPU), a quantum processing unit (QPU), tensor processing unit (TPU), or graphical processing unit (GPU) that interfaces with the computing platform via the MXM interface, where the MXM standard is limited to 200 watts of power.

A computing platform of an autonomous driving vehicle (ADV) demands high performance while at the same time requires a low profile form factor. Currently, computing systems with a low profile chassis utilizes a mobile solution. The mobile solution includes a mobile motherboard and one or more MXM modules for machine learning and artificial intelligence (AI) tasks. Some of these tasks include perception, prediction and/or planning for the ADV.

The existing MXM modules/devices follow the MXM power standard of a maximum of 200 watts. Newer MXM modules and/or custom made modules demand higher power. There is a need to design a power circuit to support more than 200 watts TDP while using the existing MXM connector when the computing platform do not offer a power expansion adapter for the MXM modules.

According to a first aspect, a power circuit for an autonomous driving vehicle (ADV) includes a first power source having a power rating of a first predetermined power threshold. The circuit includes a second power source having a power rating of a second predetermined power threshold. The circuit includes a switch coupled to the first and second power sources, the switch being configured to determining a power operating mode of an accelerator device, where the power operating mode is one of a primary mode, a secondary mode, and a dual mode. The circuit includes a first power transistor coupled between the first power source and the accelerator device. The circuit includes a second power transistor coupled between the second power source and the accelerator device. The first and second power transistors are operable according to the power operating mode and the accelerator device is an expansion device at an autonomous driving system (ADS) of the ADV for machine learning tasks.

According to a second aspect, a method/system to supply power to an accelerator device of an autonomous driving vehicle (ADV) is provided. The system determines a power operating mode of the accelerator device, where the power operating mode is one of: a primary mode, a secondary mode, and a dual mode. The system configures a switch disposed on the accelerator device to power on a first power transistor coupled between a first power source and an accelerator device to provide power from the first power source to the accelerator device when the power operating mode is in the primary mode, the first power source having a power rating of a first predetermined power threshold. The system configures the switch to power on a second power transistor coupled between a second power source and the accelerator device to provide power from the second power source to the accelerator device when the power operating mode is in the secondary mode, the second power source having a power rating of a second predetermined power threshold. The system configures the switch to power on the first and the second power transistors to provide power from the first and second power sources to the accelerator device when the power operating mode is in the dual mode, where the accelerator device is an expansion device at an autonomous driving system (ADS) of the ADV for machine learning tasks.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
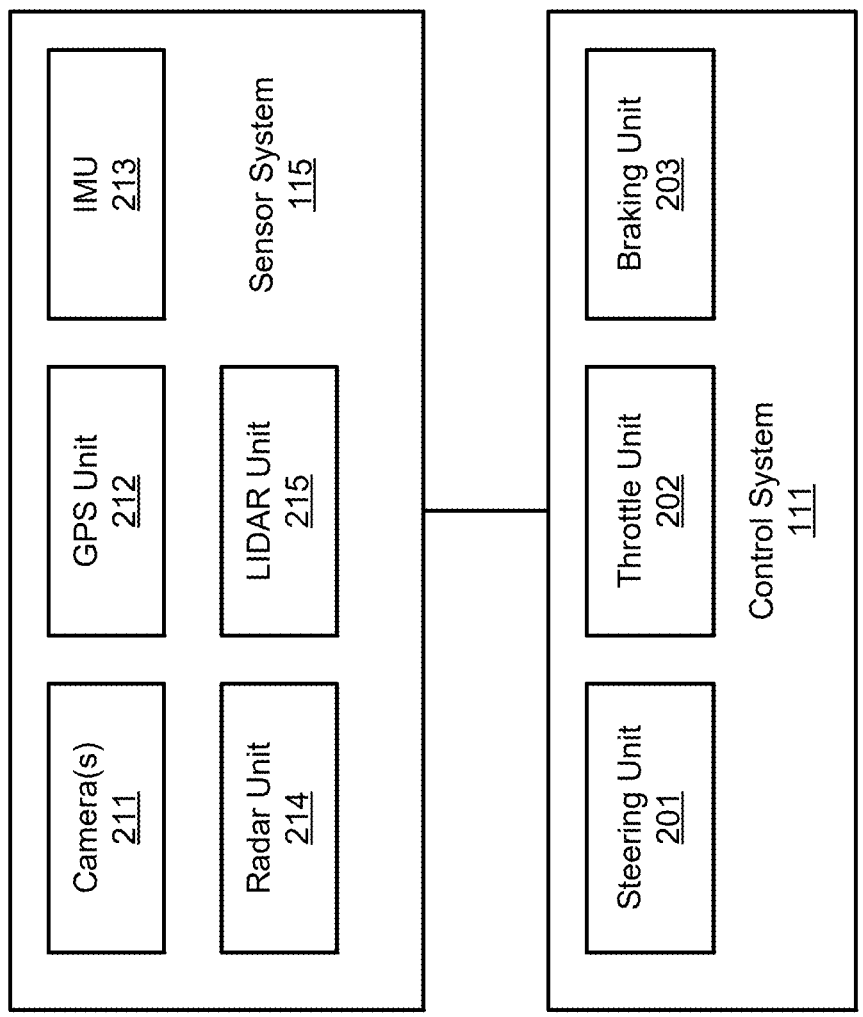
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include machine learning algorithms/AI models for specific tasks, such as artificial neural network (e.g., deep convolutional neural networks CNN, large transformer neural networks, etc.), support vector machine (SVM), k-mean clustering, reinforcement learning algorithms, or k-nearest neighbors, or random forest algorithms, etc. For example, a CNN model can be trained to perceive a surround environment of the ADV, a transformer neural network ca be trained for make driving decisions for the vehicle.

Algorithms 124 can then be uploaded on ADVs to be utilized during autonomous driving in real-time.

Figure 3A:
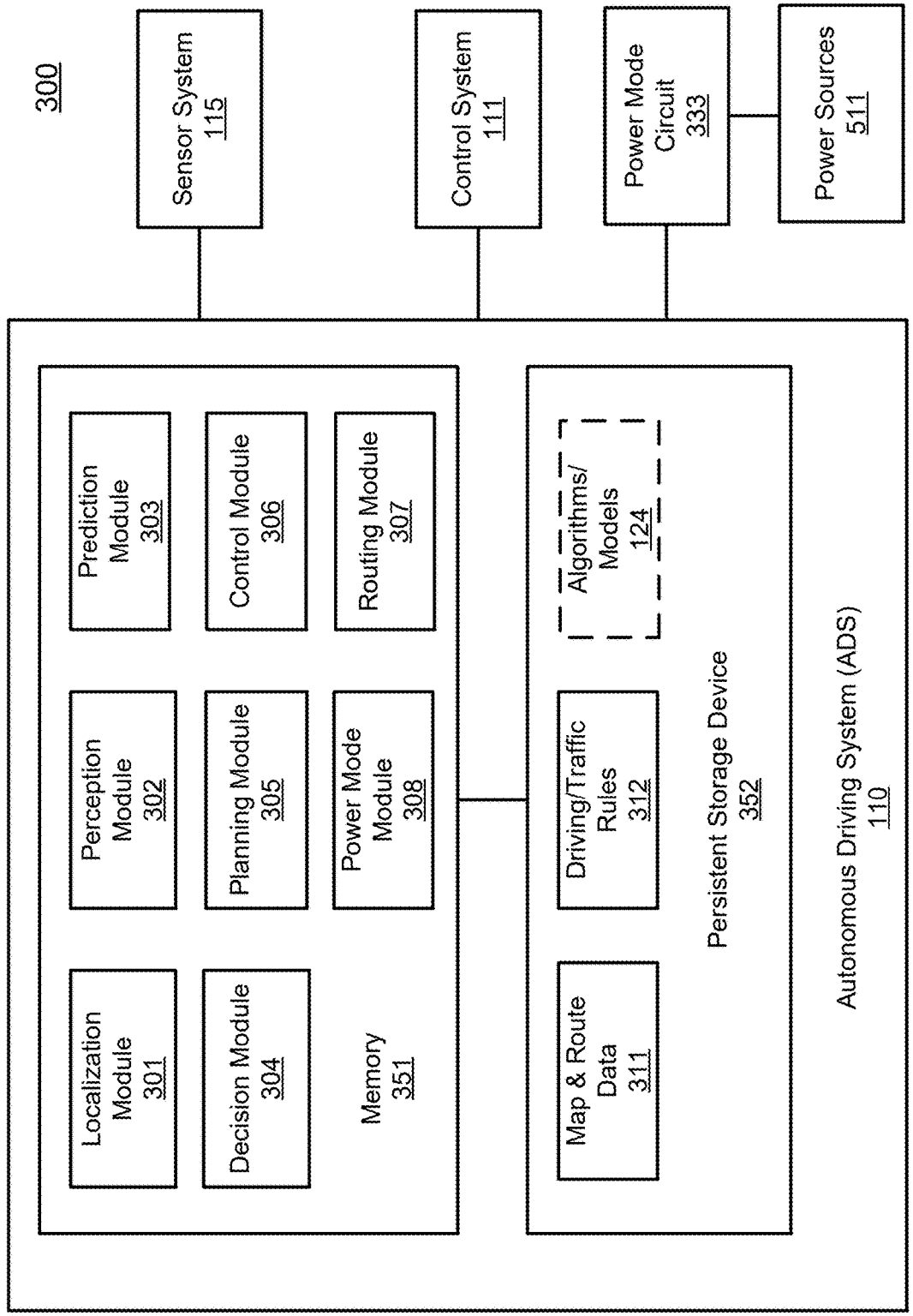
FIGS. 3A-3B are block diagrams illustrating an example of an autonomous driving system used with an autonomous driving vehicle according to one embodiment.
Figure 3B:
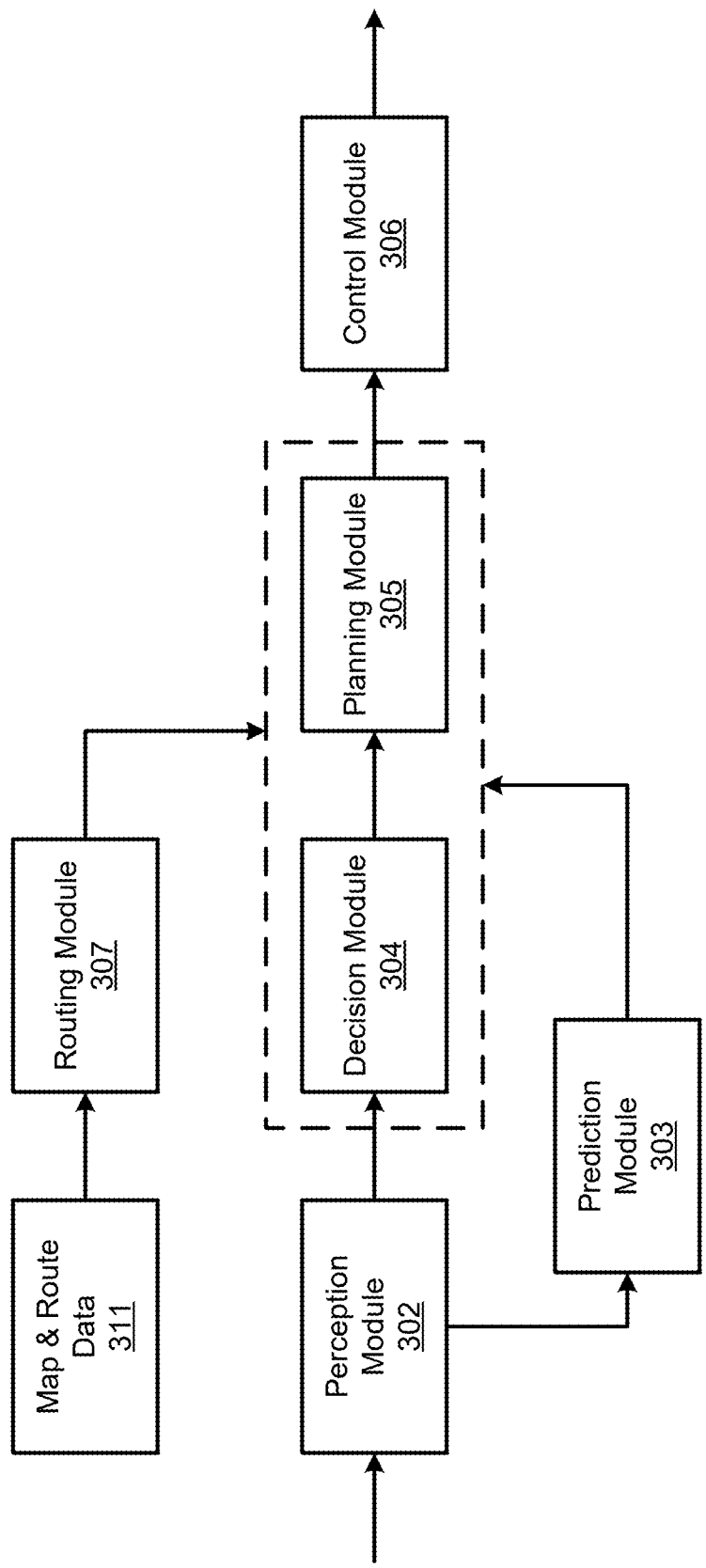

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, power mode module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. For example, power mode module 308 can be coupled to power mode circuit 333 that receives power from power source 511. Power sources 511 can be one or more lead acid batteries, solar panels, power generators of the vehicle, and or combinations thereof. Some of modules 301-308 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Power mode module 308 can determine the power mode setting for a MXM module of the computing platform (ADS) of the ADV. The power can be a primary (mode) setting, a secondary (or redundant) setting, or a dual setting, where the primary setting configures a circuit path for a MXM module to receive power at the MXM connector (e.g., MXM version 1.0, 2.0, 3.0, 4.0, MXM-A, MXM-B, etc.) using the MXM interface, the secondary setting configures the circuit path for the MXM module to receive power at an auxiliary connector of the MXM module, and the dual setting configures the circuit path for the MXM module to receive power at both the MXM connector and the auxiliary connector of the MXM module.

Figure 4:
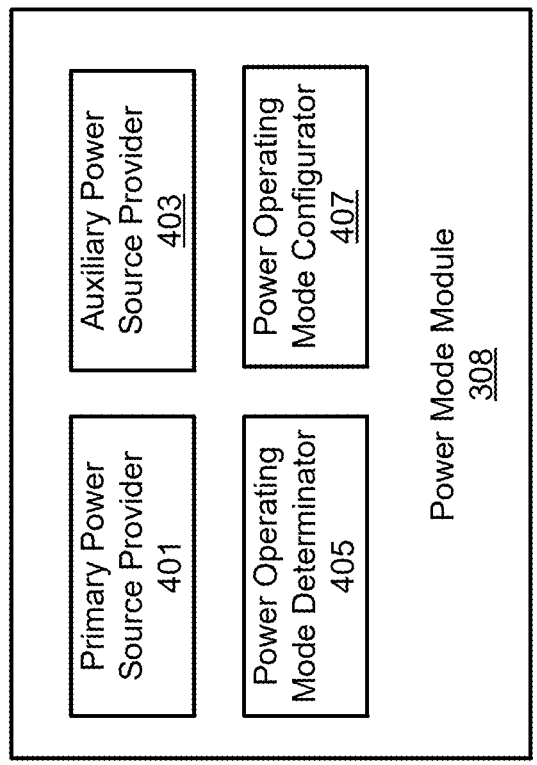
FIG. 4 is a block diagram of a power mode configuration module according to one embodiment.

FIG. 4 is a block diagram of a power mode module 308 according to one embodiment. Power mode module 308 can provide power to a MXM module (such as an accelerator unit, a graphical processing unit (GPU)) of the ADS. The ADS can correspond to a computing platform that has a low profile form factor, such as a server-grade computing system with a mobile motherboard, or a mini-Information Technology eXtended (ITX) motherboard. In one embodiment, power mode module 308 can include primary power source provider 401, auxiliary power source provider 403, power operating mode determiner 405, and power operating mode configurator 407. Primary power source provider 401 can enable (software or hardware) a power delivery path to the MXM connector of the MXM module. Auxiliary power source provider 403 can enable (software or hardware) a power delivery path to the auxiliary connector of the MXM module. Power operating mode determiner 405 can determine an operating mode of the MXM module. The operating modes can be primary, secondary, or dual modes. Power operating mode configurator 407 can configure a power mode circuit (such as circuit 333 of FIG. 3A) to provide power via the MXM connector when in the primary mode, via the auxiliary connector when in the secondary mode, and via both the MXM connector and the auxiliary connector when in the dual mode. Some or all of modules 401-407 may be implemented in software, hardware, or a combination thereof. For example, these modules may be installed in storage device(s) 352, loaded into memory 351, and executed by one or more processor(s). Some of modules 401-407 may be integrated together as an integrated module.

FIG. 5A is a top view of a block diagram illustrating a mobile computing platform for an autonomous driving vehicle according to one embodiment. FIG. 5B is a side view of a block diagram illustrating a mobile computing platform for an autonomous driving vehicle according to one embodiment. FIGS. 5A-5B can be an example of a computing platform 500 for the ADS of the ADV. Referring to FIGS. 5A-5B, platform 500 can include a motherboard 501. Motherboard 501 can be a mobile motherboard such as a motherboard for a server-grade mobile server. In some embodiments, motherboard 501 can be a mini-ATX motherboard. Motherboard 501 can include MXM slot(s) 505, where accelerator device(s) 503 can interface to motherboard 501. MXM slot can provide a MXM interface having 230 pins. Accelerator device 503 can be a high-end device with a Mobile PCI Express Module (MXM) interface, where device 503 can draw large amount of power, e.g., a power that range between approximately 200 watts to approximately 600 watts. In one embodiment, MXM interface 513 of accelerator device 503 is limited to the 200 watts provided by the MXM standard (e.g., MXM type B). The power route/path for the MXM interface can be provided by conductor path 515. Accelerator device can include an auxiliary power connector 507, where additional power can be provided to accelerator device 503 via conductor path 517. Auxiliary power connector 507 can be a standard 2-pin, 4-pin, 6-pin, 8-pin power connector or the like. The conductor paths 515 and 517 can be coupled to power and sequence circuit 509 which supplies power from power source(s) 511. Power and sequence circuit 509 can represent logic circuits disposed on the motherboard which provide a power sequence in which voltage is applied to, and/or removed from, the power rails of the motherboard. Power source(s) 511 can include one or more power source(s) that are supplied by a single lead acid battery, two or more separate lead acid batteries, lithium batteries, a power generator of the ADV, or a combination thereof. In one embodiment, the power source(s) can supply power at approximately 12-13.8 nominal volts. In one embodiment, motherboard 501 includes power mode circuit 333 disposed on motherboard 501. In another embodiment, power mode circuit 333 is disposed on accelerator device 503. Power mode circuit 333 can determine a suitable operating mode (primary, secondary, or dual mode) of accelerator device 503. In some embodiments, the operating mode can be determined from a type of workload for accelerator device 503. For example, when ADS plans to perform machine learning and AI tasks using accelerator device 503, power mode circuit 333 predicts the operating mode to be secondary or dual mode. In one embodiment, power mode circuit 333 determines the operating mode to be a primary mode when the vehicle turns on. In one embodiment, the operating mode is manually configured by an operator of ADV prior to the vehicle being turned on. In one embodiment, power mode circuit 333 determines the operating mode due to the detected power drawn by accelerator device 503. For example, the power drawn by device 503 can be sensed at the power sequence circuit and the sensed power can be used to select an operating mode.

In one embodiment, power mode circuit 333 can be reworked into a PCB board of accelerator device 503. In another embodiment, power mode circuit 333 can be a wrapper circuit for accelerator device 503. For example, power mode circuit 333 can include an expansion MXM connector 523 and an expansion auxiliary connector 527. Power mode circuit 333 is coupled to connectors 523 and 527 to control when power is supplied to connectors 513 and 507 of accelerator device 503.

Although motherboard 501 is shown to have one accelerator device 503 and one power mode circuit, more than one accelerator devices and/or power mode circuit can be inserted at one or more MXM connectors available at motherboard 501.

Figure 6B:
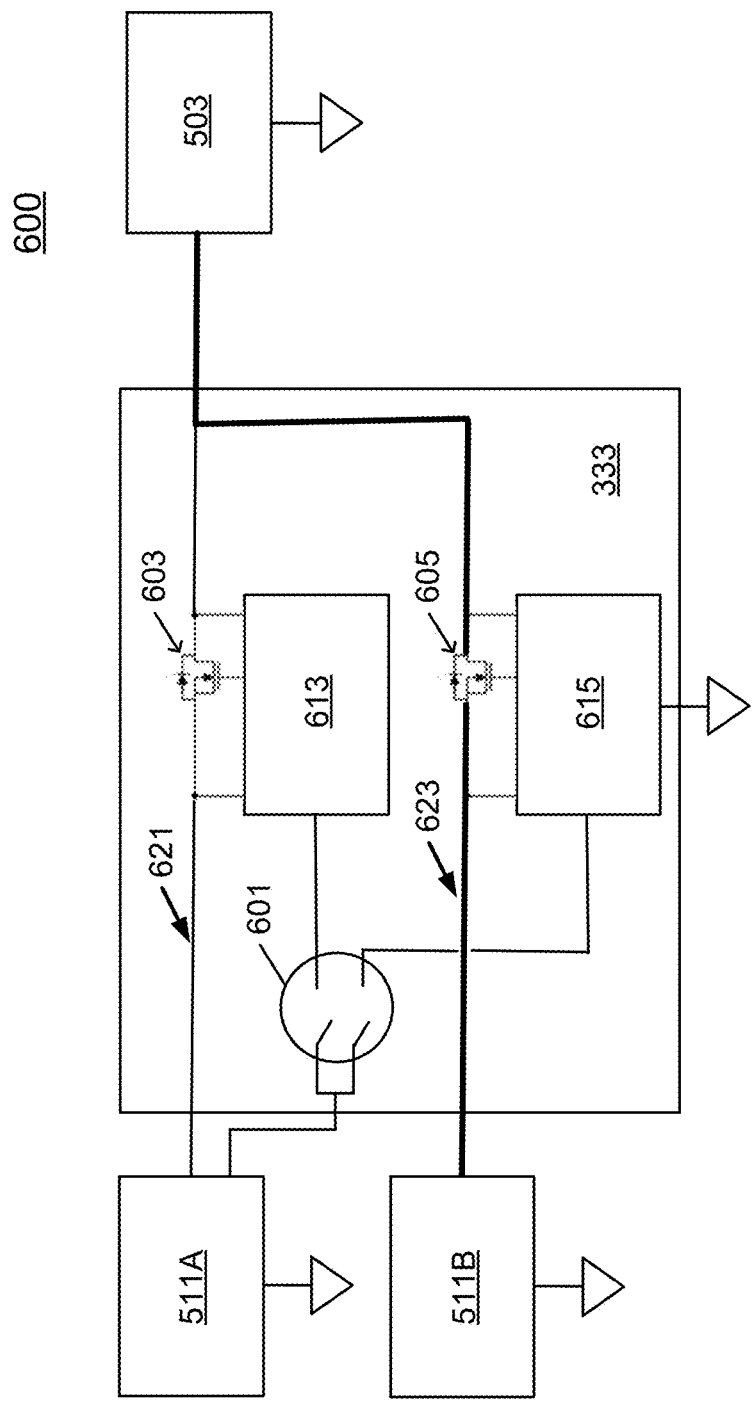
FIG. 6B is a block diagram illustrating a power mode circuit operating in a secondary mode according to one embodiment.
Figure 6C:
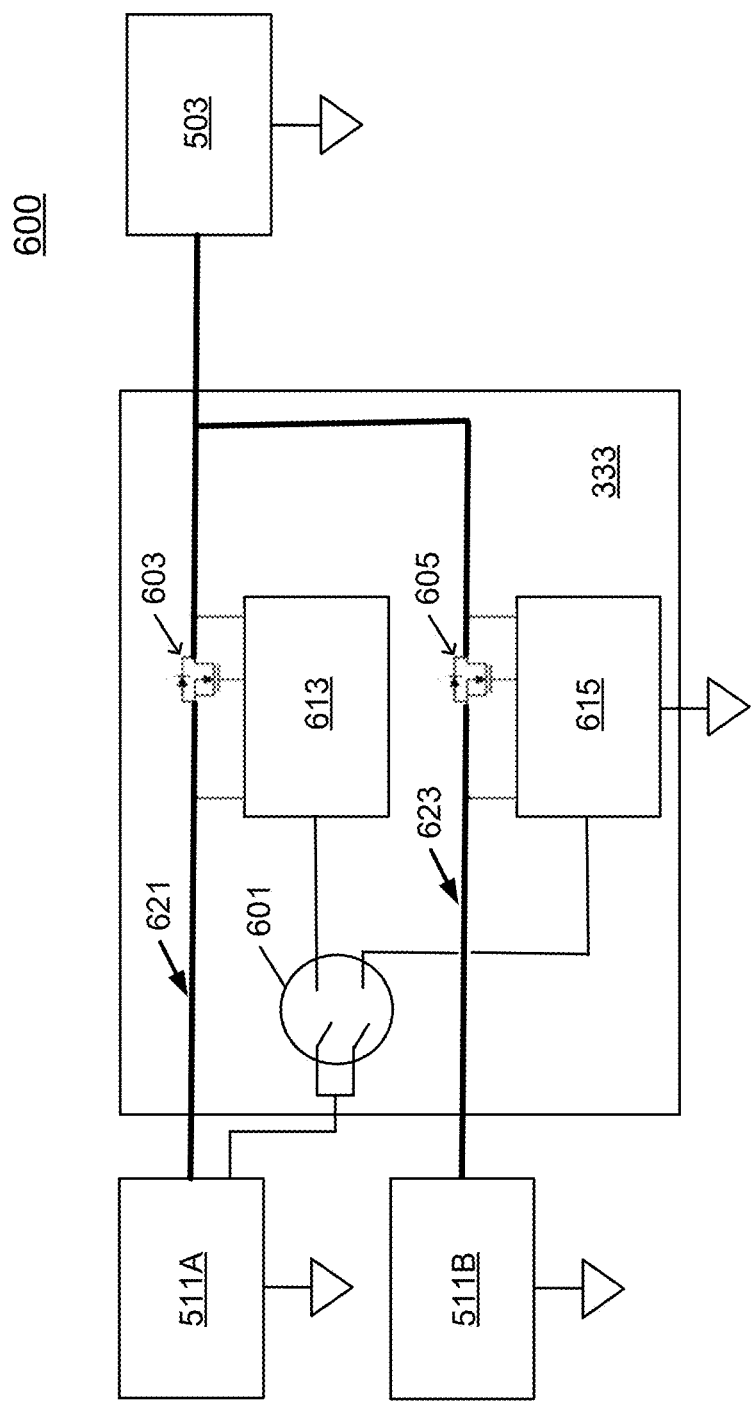
FIG. 6C is a block diagram illustrating a power mode circuit operating in a dual mode according to one embodiment.

FIG. 6A is a block diagram illustrating a power mode circuit 333 operating in a primary mode according to one embodiment. FIG. 6B is a block diagram illustrating a power mode circuit 333 operating in a secondary mode according to one embodiment. FIG. 6C is a block diagram illustrating a power mode circuit 333 operating in a dual mode according to one embodiment.

Power mode circuit 333 can receive power from power source(s) 511A-511B and supply a power to an accelerator device 503. Power source(s) 511A-511B can represent the power supplied at respective lines 515-517 of FIG. 5. Referring to FIG. 6A-6C, in some embodiments, power mode circuit 333 can include circuit paths 621-623. Circuit path 621 can include power transistor 603 and a power switch controller 613 in parallel with transistor 603, where power switch controller 613 controls the switching operation of power transistor 603. An example of a power switch controller 613 can be the AP74700Q of Diodes Incorporated. Power transistor 603 can be a MOSFET, silicon carbide (SiC) MOSFETs, GaN Transistors, IGBTs or the like. An example of a MOSET can be the OptiMOS™ power MOSFET for automotive application.

Circuit path 623 can include power transistor 605 and a power switch controller 615 in parallel with transistor 605, where power switch controller 615 controls the switching operation of power transistor 605. A switch 601 can be disposed on power mode circuit 333, where switch 601 can include an input coupled to a power and sequencing circuit (e.g., at power source 511A) and two outputs coupled to the enable ports of switch controllers 613-615.

Referring to FIGS. 6A-6C, when power mode circuit 333 is in a primary mode, path 621 is closed (shown as bold) and power source 511A is provided to 503. When power mode circuit 333 is in a secondary mode, path 623 is closed (shown as bold) and power source 511B is provided to 503. When power mode circuit 333 is in a dual mode, paths 621-623 are closed (shown as bold) and power sources 511A-511B are both provided to device 503 in an ORing manner, e.g., two inputs are OR'd to provide power to device 503. Here, source 511A can correspond to one or more pins at a MXM connector which has a power limit of 200 watts. The power rating of source 511B can be predetermined, such as a 200, 300, 400 watts, etc. When sources 511A-511B are provided in an ORing manner, power delivery from power sources to device 503 can be approximately 400-600 watts. In one embodiment, the power supplied to sources 511A-511B can originate from a lead-acid battery, a lithium battery, a generator or other power sources available at the vehicle.

Figure 7:
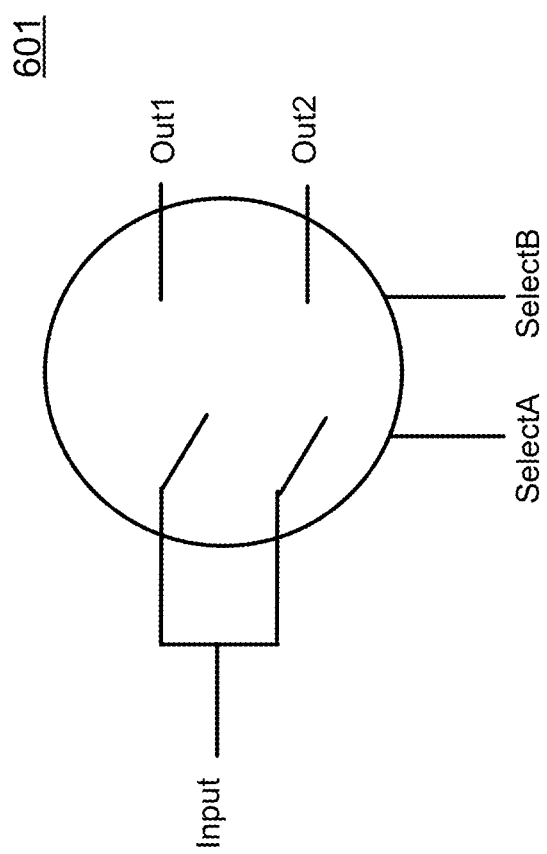
FIG. 7 is a block diagram illustrating a switch according to one embodiment.

FIG. 7 is a block diagram illustrating a switch 601 according to one embodiment. Switch 601 can have an input and two output pins. In one embodiment, switch 601 can be a logic circuit and module 308 of FIG. 4 controls switch 601 to configure the operating mode (primary, secondary, or dual mode). In one embodiment, module 308 controls switch 601 via the MXM interface of an accelerator device. In one embodiment, switch 601 has a truth table as shown in Table 1. In Table 1, "zero" denotes respective circuit paths 621-623 of FIGS. 6A-6C are open (e.g., no power supplied). "Input" denotes the circuit paths 621-623 are open and/or closed according to a power sequencing circuit, e.g., "Input" is connected to a power sequencing circuit. Switch 601 can be implemented in various manners. For example, in one embodiment, switch 601 can be implemented using three single pole double throw switches, e.g., one SPDT switch coupled between the Input, and the two input ports of two SPDT switches in a fanout manner. SelectA is coupled to a select port of the first SPDT, and SelectB is coupled to the select of the remaining SPDT. The outputs of the two SPDT switches provides the four states as shown in Table 1. In another embodiment, switch 601 can be implemented using and/or/xor logic circuit gates. For example, according to the truth table, Out1=Input and SelectA; Out2=Input and SelectB. In another embodiment, switch 601 can be implemented as a software logic or as logic gates on a FPGA board.

TABLE 1

| SelectA | SelectB | Out1  | Out2  |
|---------|---------|-------|-------|
| 0       | 0       | 0     | 0     |
| 1       | 0       | Input | 0     |
| 0       | 1       | 0     | Input |
| 1       | 1       | Input | Input |

Figure 8:
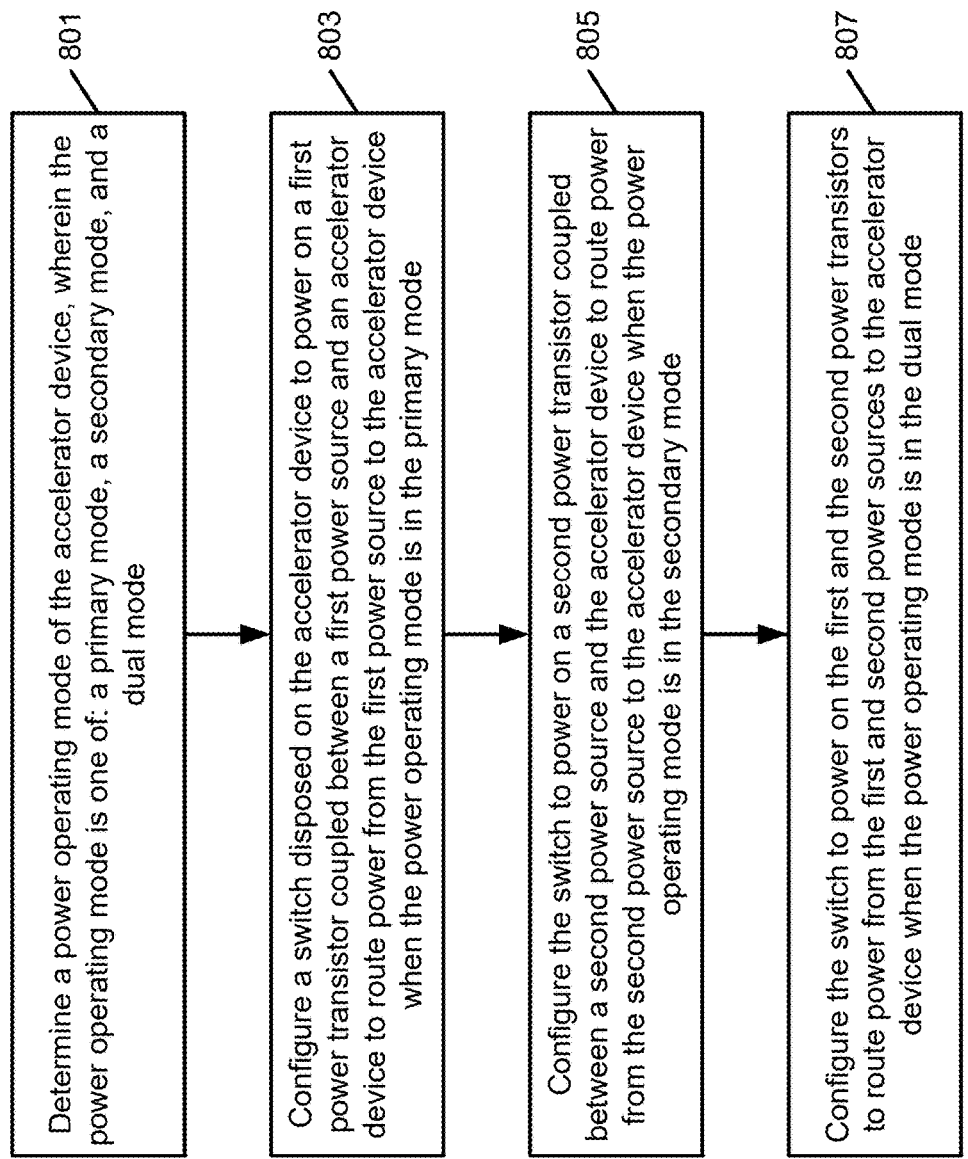
FIG. 8 is a flow diagram to operate a power mode circuit according to one embodiment.

FIG. 8 is a flow diagram to operate a power mode circuit according to one embodiment. Process 800 may be performed by processing logic which may include software, hardware, or a combination thereof. Process 800 may be performed by power mode module 308 to control power mode circuit 333 of FIG. 3A.

Referring to FIG. 8, at block 801, processing logic determines a power operating mode of the accelerator device. The power operating mode is one of a primary mode, a secondary mode, and a dual mode.

At block 803, processing logic configures a switch disposed on the accelerator device to power on a first power transistor coupled between a first power source (MXM interface) and an accelerator device (MXM module) to provide power from the first power source to the accelerator device when the power operating mode is in the primary mode. The first power source has a power rating of a first predetermined power threshold.

At block 805, processing logic configures the switch to power on a second power transistor coupled between a second power source (auxiliary interface) and the accelerator device to provide power from the second power source to the accelerator device when the power operating mode is in the secondary mode. The second power source having a power rating of a second predetermined power threshold.

At block 807, processing logic configures the switch to power on the first and the second power transistors to provide power from the first and second power sources to the accelerator device when the power operating mode is in the dual mode. The accelerator device is an expansion device inserted at an autonomous driving system (ADS) of the ADV for machine learning tasks.

In one embodiment, processing logic further controls the switching of the first power transistor using a first controller coupled between a first output of the switch and a gate of the first power transistor, and controls the switching of the second power transistor using a second controller coupled between a second output of the switch and a gate of the second power transistor.

In one embodiment, the power rating of the first predetermined power threshold corresponds to a power rating provided by a mobile PCI express module (MXM) interconnect standard.

In one embodiment, if the operating mode is in a dual mode, the first input and the second input provides power in an ORing manner to the accelerator device.

In one embodiment, the power rating of the second predetermined power threshold is approximately twice the first predetermined power threshold.

In one embodiment, the ADS is a computing platform with a low profile form factor.

In one embodiment, the first power source and the second power source are supplied by two separate lead acid batteries of the ADV or a combination of a lead acid battery of the ADV and a power generator.

In one embodiment, the first power source is rated at approximately 200 watts and the second power source is rated at approximately 400 watts.

In one embodiment, the switch is a low power switch device and the switch is further configured to enable or disable the first and/or second power transistors according to a power sequence of the accelerator device.

In one embodiment, the first power source is provided at a corresponding MXM connector of the accelerator device and the second power source is provided at a corresponding auxiliary power connector of the accelerator device.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A power circuit for an autonomous driving vehicle (ADV), comprising:
    a first input to be coupled to a first power source having a first power rating;
    a second input to be coupled to a second power source having a second power rating;
    a switch to be coupled to the first and second power sources, the switch being configured to determining a power operating mode of an accelerator device;
    a first power transistor coupled between the first power source and the accelerator device; and
    a second power transistor coupled between the second power source and the accelerator device, wherein the first and second power transistors are operable according to the power operating mode.

2. The circuit of claim 1, further comprising:
    a first controller coupled between a first output of the switch and a gate of the first power transistor, wherein the first controller is configured to control the switching of the first power transistor; and
    a second controller coupled between a second output of the switch and a gate of the second power transistor, wherein the second controller is configured to control the switching of the second power transistor.

3. The circuit of claim 1, wherein the first power rating corresponds to a power rating provided by a mobile PCI express module (MXM) interconnect standard.

4. The circuit of claim 1, wherein the power operating mode is one of a primary mode, a secondary mode, and a dual mode.

5. The circuit of claim 4, wherein if the operating mode is in a dual mode, the first input and the second input provide power to the accelerator device in an ORing manner.

6. The circuit of claim 1, wherein the second power rating is approximately twice the first power rating.

7. The circuit of claim 1, wherein the accelerator device is an expansion device at an autonomous driving system (ADS) of the ADV for machine learning tasks.

8. The circuit of claim 7, wherein the ADS is a computing platform with a low profile form factor.

9. The circuit of claim 1, wherein the first power source and the second power source are supplied by two separate lead acid batteries of the ADV or a combination of a lead acid battery of the ADV and a power generator.

10. The circuit of claim 1, wherein the first power source is rated at approximately 200 watts and the second power source is rated at approximately 400 watts.

11. The circuit of claim 1, wherein the switch is a low power switch and the switch is further configured to enable or disable the first and/or second power transistors according to a power sequence of the accelerator device.

12. A method to supply power to an accelerator device of an autonomous driving vehicle (ADV), comprising:
    determining a power operating mode of the accelerator device, wherein the power operating mode is one of a primary mode, a secondary mode, and a dual mode;
    configuring a switch disposed on the accelerator device to power on a first power transistor coupled between a first power source and the accelerator device to provide power from the first power source to the accelerator device when the power operating mode is in the primary mode;
    configuring the switch to power on a second power transistor coupled between a second power source and the accelerator device to provide power from the second power source to the accelerator device when the power operating mode is in the secondary mode; and
    configuring the switch to power on the first and the second power transistors to provide power from the first and second power sources to the accelerator device when the power operating mode is in the dual mode.

13. The method of claim 12, further comprising controlling the switching of the first power transistor using a first controller coupled between a first output of the switch and a gate of the first power transistor, and controlling the switching of the second power transistor using a second controller coupled between a second output of the switch and a gate of the second power transistor.

14. The method of claim 12, wherein the first power rating corresponds to a power rating provided by a mobile PCI express module (MXM) interconnect standard.

15. The method of claim 12, wherein if the operating mode is in a dual mode, the first power transistor and the second power transistor provide power to the accelerator device in an ORing manner.

16. The method of claim 12, wherein the second power rating is approximately twice the first power rating.

17. The method of claim 12, wherein the accelerator device is an expansion device at an autonomous driving system (ADS) of the ADV and is used to perform machine learning tasks for the ADV, and wherein the ADS is a computing platform with a low profile form factor.

18. The method of claim 12, wherein the first power source and the second power source are supplied by two separate lead acid batteries of the ADV or a combination of a lead acid battery of the ADV and a power generator.

19. The method of claim 12, wherein the switch is a low power switch device and the switch is further configured to enable or disable the first and/or second power transistors according to a power sequence of the accelerator device.

20. An autonomous driving vehicle (ADV), comprising:
a first power source having a first power rating;
a second power source having a second power rating;
an accelerator device;
a first input to be coupled to the first power source;
a second input to be coupled to the second power source;
a switch to be coupled to the first and second power sources, the switch being configured to determining a power operating mode of the accelerator device;
a first power transistor coupled between the first power source and the accelerator device; and
a second power transistor coupled between the second power source and the accelerator device, wherein the first and second power transistors are operable according to the power operating mode.

* * * * *